United States Patent Office
2,730,441
Patented Jan. 10, 1956

2,730,441

PROCESS OF REDUCING IRON FORMATE

Henry L. Crowley, South Orange, N. J., assignor, by mesne assignments, to Republic Steel Corporation, Cleveland, Ohio, a corporation of New Jersey No Drawing. Application February 2, 1953,
Serial No. 334,735

3 Claims. (Cl. 75—.5)

This invention relates to the reduction of iron formate to metallic iron and more particularly to the reduction of iron formate in the presence of hydrogen chloride to produce a very finely divided iron powder with a lessened tendency towards pyrophorism as compared with iron powder made by conventional methods of reducing iron formate.

Finely divided iron powder having a particle size in the order of about 100 to 1000 Angstrom units, has been desired for the production of permanent magnets for a considerable period of time. It has been found that when iron particles are sufficiently small, each particle appears to have a characteristic of a permanent magnet, so that an aggregate made by pressing and bonding these particles together (as with a resin) also has permanent magnetic characteristics.

In the past, one method of producing iron powder of this desired fineness has been by the reduction of iron formate with hydrogen. When iron formate is reduced by hydrogen at very low temperatures, i. e., between about 200° C. and about 500° C., the iron powder formed by this reduction is of very fine particle size, generally being smaller, the lower the temperature of reduction. For this reason, iron powder produced by reduction of iron formate is much more desirable for the making of permanent magnets than is the product of the reduction of other iron compounds, such as iron oxides, which may be reduced only at much higher temperatures and yield a much coarser iron powder.

Despite the desirable characteristics of iron powder made by the hydrogen reduction of iron formate with respect to particle size, the powder so produced by prior art methods has a very serious disadvantage in that it is invariably of a violently pyrophoric nature. So strongly pyrophoric is powder produced by previously conventional iron formate reductions that it must be stored under some protective liquid, such as kerosene, immediately upon removal from the reduction furnace to prevent rapid and spontaneous oxidation. This precaution adds greatly to the expense of operation and presents great difficulty in handling the powder and processing it for ultimate use. Moreover, it has been found that parts made from this highly pyrophoric powder tend themselves to be pyrophoric and thus may spontaneously ignite in the air merely upon being jarred slightly, particularly if the protective coating of resin with which such parts generally are covered is ruptured. This makes their use in conventional electrical appliances, such as are used in the home, highly undesirable and also renders the transportation of such articles highly difficult and dangerous. In addition, the oxidation incident to less violent manifestations of pyrophorism has a deleterious effect on the magnetic properties of such articles.

It is an object of this invention, therefore, to provide a method of producing finely divided iron powder with a reduced tendency towards pyrophorism by the reduction of iron formate with hydrogen.

It is a further object of this invention to provide a process for the reduction of iron formate at low temperatures that will inhibit the growth of undesirably large particles of iron, while at the same time producing iron powder with a reduced tendency towards pyrophorism, as aforesaid.

These objects and others which will be apparent later are accomplished by providing at least a trace of gaseous hydrogen chloride gas in the reducing gas, which is used to convert iron formate to metallic iron. It has been found that when gaseous hydrogen chloride is present in amounts varying between a trace (which for the purpose of this application may be taken to be at least 0.1% by volume) and the amount that will convert a substantial amount of the metallic iron produced to ferrous chloride, the desired finely divided iron of reduced tendency towards pyrophorism is produced.

Summarizing the present invention, a non-pyrophoric iron in finely divided form is made by introducing iron formate in a reaction zone, introducing into this reaction zone in contact with said iron formate, a reducing gas, the essential active ingredients of which consist of hydrogen and from about 0.1% by volume of hydrogen chloride (based on the total of hydrogen plus hydrogen chloride) up to an amount of hydrogen chloride which will convert a substantial amount of the iron to ferrous chloride, and maintaining the iron formate and the reducing gas in the reaction zone in the temperature range of about 200° C. to about 500° C.

In practicing the invention, iron formate is placed in a reaction zone and contacted with the reducing gas containing hydrogen as its essential active reducing ingredient. The apparatus in which this reaction may be performed forms per se no part of the invention, but may be any apparatus in which efficient gas-to-solid contact between iron formate and the reducing gas may be obtained. The reduction may be carried on batch-wise or in a continuous manner as by moving the iron formate through a rotating tube countercurrent to the flow of the reducing gas. The hydrogen chloride which is added to the reducing gas before the reducing gas is contacted with the iron formate may be added in any suitable manner, such as through a mixing valve or by bubbling the reducing gas through a solution of commercial (30%) hydrochloric acid. This latter method causes the pick-up of a sufficient amount of HCl to prevent pyrophorism. It has been found that a simple horizontal tube of suitable refractory material suitably heated and insulated to maintain the desired temperature may be used as the reaction zone. The iron formate may be placed in the bottom of the tube and the reducing gas containing the desired amount of hydrogen chloride passed through the tube in contact with the iron formate. After the reduction of the iron formate is completed, the reaction zone is purged of hydrogen with an inert gas such as nitrogen, or at least a non-oxidizing gas or a mixture of such gases, and the iron powder formed by the reduction of the iron formate is cooled to room temperature while maintaining it under non-oxidizing conditions. The iron powder may then be exposed to air without any danger of spontaneous ignition.

The iron formate which is used as the starting material of this invention may be made in any suitable manner, which forms no part of the present invention. One method, however, may be the treatment of scrap iron with formic acid and subsequently crystallizing the iron formate from solution. The iron formate crystals are then preferably dried before introducing them into the reaction zone.

The hydrogen used as the reducing agent for the iron formate may be from any source and may be mixed with any one or more inert gases such as nitrogen, which will not enter into chemical reaction with either hydrogen or iron formate. The amount of hydrogen to be used is not particularly critical as long as sufficient hydrogen is provided to react with all of the iron formate present to form metallic iron. In practice, hydrogen will be supplied at a sufficient rate so that several times the stoichiometric quantity of hydrogen will be passed in contact with the iron formate during the reduction period. The amount of this excess is not particularly critical.

In order to prevent the iron powder formed by the reduction of iron formate from being violently pyrophoric, it has been found that at least a trace of HCl gas must be present in the reducing gas introduced into the reaction zone. As noted above, the hydrogen chloride may be supplied as a gas and mixed with the hydrogen before contact with the iron formate, or it may be introduced into the reducing gas by bubbling the reducing gas through an aqueous solution of hydrogen chloride. Generally, sufficient gaseous hydrogen chloride is picked up in the reducing gas by this latter method to substantially reduce pyrophorism. The lower limit of hydrogen chloride concentration is a trace of this substance which, for the purpose of this application may be taken as 0.1% by volume (based on the total of hydrogen plus hydrogen chloride). The amount of hydrogen chloride that can be picked up by bubbling hydrogen through commercial hydrochloric acid at room temperature is about 0.7% by volume; and this amount has been found to be ample for the substantial reduction of pyrophorism.

The upper limit of hydrogen chloride concentration is determined by the amount of hydrogen chloride that would be required at the reaction temperature to convert a substantial amount of the iron present in any form in the reaction zone to ferrous chloride. This amount is found to vary with temperature, the permitted maximum concentration being lower with lower reaction temperatures. Thus, at 500° C., concentrations in excess of 2% hydrogen chloride will cause chloridizing of the iron; while at about 400° C. more than 1% hydrogen chloride will cause substantial chloridizing. At lower temperatures the amount of hydrogen chloride that can be tolerated without chloridizing a substantial amount of the iron present as aforesaid is somewhat less than 1% by volume. In order substantially to prevent the formation of ferrous chloride, which is undesirable in this case, and to assure the production of substantially pure iron powder, the amount of hydrogen chloride must be controlled so as to be always below the amount of HCl that will produce substantial chloridizing as set forth above.

The reason for the substantial reduction of pyrophorism by merely a trace of hydrogen chloride in the reducing gas is not at present fully understood. It is believed, however, that the presence of the hydrogen chloride may effect a recrystallization of the iron particles so as to reform such particles in a more stable lattice configuration than would result by the reduction of iron formate in the absence of hydrogen chloride. This explanation is a mere theory, however, and is not relied upon particularly in support of the patentability of the present invention.

The lower temperature limit of the present invention is determined by the lowest temperature at which iron formate is reduced at an appreciable rate, so as to make the process commercially practicable. In practice, this lower temperature limit has been found to be about 200° C.

The upper temperature limit is determined by the character of the iron powder produced. In the making of iron powder for permanent magnets, a product of very small particle size is desired. Since particle size of the powder tends to increase with increase in reduction temperature, the maximum temperature is that at which iron powder having the largest particle size still useful for permanent magnets or some other special purpose may be produced. It has been found that this temperature is about 500° C. for powder usable for permanent magnets.

In most prior proposals or discussion regarding the reduction of iron formate by hydrogen; it has been considered that a dry gas must be used and that the gaseous products of the reaction, namely water vapor, must be removed from the situs of the reduction as rapidly as possible. This is in accordance with the well-known principle of mass action; since water vapor is a product of the reaction, its presence would tend to impede the completion of the reduction of iron formate. It has now been found and is to be considered a part of the present invention, that the presence of a small amount of water vapor, less than the amount that would be present if the system, hydrogen, iron, iron formate and water were in equilibrium, not only does not impede the reduction reaction but at the same time hinders the growth of undesirably large particles of metallic iron. This is especially important in the temperature range of 400° C.-500° C. since at lower temperatures the tendency toward crystal growth is much less pronounced. For this reason, in some forms of the invention, a small amount of water vapor is positively included in the reducing gas. A suitable amount of water vapor may be picked up by bubbling the hydrogen used as a reducing gas through an aqueous solution of hydrogen chloride at room temperature. Since the equilibrium constant of the system: hydrogen, water, iron and iron formate varies with temperature, the amount of water vapor that can be tolerated without seriously interfering with the reduction reaction is dependent upon the temperature. Thus, at the minimum reduction temperature of 200° C. less than about 1% by volume of water vapor must be present, while at 500° C., the upper temperature limit of the reaction, as much as 15% water vapor may be present in the reducing gas without substantially impeding the reduction reaction. It has been found that for the purpose of preventing undesirable growth of iron crystals, only a small amount of the water vapor is necessary, such as for example about 0.1% by volume.

The invention is further illustrated by the following specific example:

Iron formate [$Fe(CHO_2)_3$] was placed in a horizontal tube which was insulated and which was heated electrically. The reducing gas containing about 90% by volume of hydrogen and 10% by volume of nitrogen, was bubbled through a solution of commercial (30%) hydrochloric acid (aqueous) at room temperature, so that it picked up water vapor and hydrogen chloride. The composition of the gases as they entered the reaction zone in contact with the iron formate were (by volume): 0.7% hydrogen chloride, and 1.0% water vapor, the balance of the gas being hydrogen and nitrogen in the proportions given above. The reducing gas and the iron formate were both maintained at a temperature of about 260° C., and the reducing gas was passed into contact with the iron formate for about four hours to complete the reduction thereof to metallic iron. At the end of the reducing period, the reaction zone was flooded with a mixture of dry hydrogen and nitrogen in about equal portions and allowed to cool to room temperature. The iron powder was then exposed to the air and was found to be stable and non-pyrophoric to the extent that no spontaneous oxidation occurred. The powder was very finely divided and was found to have properties well adapted for use in the fabrication of permanent magnets.

While but one specific example of the operation of the process has been given herein, the principles of the process have been set forth in sufficient detail to enable those skilled in the art to carry on the process. Equivalents of the process are in part taught herein and in part will be obvious from the present teachings. We do not wish to be limited, therefore, except by the scope of the appended claims, which are to be construed validly as broadly as the state of the prior art permits.

What is claimed is:

1. The process of making finely divided iron powder with a substantially reduced tendency towards pyrophorism, comprising the steps of introducing iron formate into a reaction zone, introducing in said reaction zone in contact with said iron formate a reducing gas, the essential active ingredients of which consist of hydrogen and from about 0.1% by volume of hydrogen chloride (based on the total volume of hydrogen plus hydrogen chloride) up to an amount of hydrogen chloride which will convert a substantial amount of the iron in the reaction zone to ferrous chloride, maintaining said iron formate and said reducing gas in said zone in a temperature range of about 200° C. to about 500° C., and cooling the powdered iron produced as aforesaid to room temperature under non-oxidizing conditions before exposure thereof to air.

2. The process according to claim 1, wherein said reducing gas contains from about 0.1% water vapor up to an amount of water vapor that will prevent the reduction of iron formate by hydrogen.

3. The process of making finely divided iron powder with a reduced tendency toward pyrophorism, comprising the steps of introducing iron formate into a reaction zone, introducing into said reaction zone in contact with said iron formate, a reducing gas consisting of (by volume): about 0.7% hydrogen chloride, about 1.0% of water vapor, about 10% nitrogen, and the balance hydrogen, and maintaining said iron formate and said reducing gas in said zone at the temperature of about 260° C., and cooling the powdered iron produced as aforesaid to room temperature under non-oxidizing conditions before exposure thereof to air.

References Cited in the file of this patent

UNITED STATES PATENTS

| 2,418,148 | Williams et al. | Apr. 1, 1947 |
| 2,592,321 | Neel | Apr. 8, 1952 |

FOREIGN PATENTS

| 740,913 | Germany | Nov. 1, 1943 |